United States Patent [19]
Heil

[11] Patent Number: 5,338,004
[45] Date of Patent: Aug. 16, 1994

[54] VALVE SEAL APPARATUS

[76] Inventor: John S. Heil, P.O. Box 1361, Pascagoula, Miss. 39567

[21] Appl. No.: 989,171

[22] Filed: Dec. 11, 1992

Related U.S. Application Data

[63] Continuation-in-part of Ser. No. 769,056, Sep. 30, 1991, Pat. No. 5,170,991, which is a continuation-in-part of Ser. No. 552,250, Jul. 16, 1990, Pat. No. 5,052,658.

[51] Int. Cl.$^5$ .............................................. F16K 41/00
[52] U.S. Cl. ..................................... 251/214; 277/27; 277/125; 277/142
[58] Field of Search ................. 251/214; 277/124, 125, 277/142, 152, 207 R, 208, 27

[56] References Cited

U.S. PATENT DOCUMENTS

| | | | |
|---|---|---|---|
| 3,443,816 | 5/1969 | Saleri et al. | 277/125 |
| 3,559,950 | 2/1971 | Nelson | 277/125 |
| 3,830,508 | 8/1974 | Endicott | 277/142 |
| 4,572,519 | 2/1986 | Cameron et al. | 277/124 |

*Primary Examiner*—George L. Walton
*Attorney, Agent, or Firm*—Pravel, Hewitt, Kimball & Krieger

[57] ABSTRACT

A valve sealing apparatus including a valving member, a valve bonnet having a continuous bore that communicates with the valving member, a valve shaft housed within the bore of the bonnet, a primary sealing member positioned in the bore of the valve bonnet which surrounds the valve shaft, and an annular ring positioned between the wall of the valve shaft and the wall of the bonnet for pressing into the face of the primary sealing member, for imparting a downward force on the primary sealing member, in order to prevent horizontal fluid flow between the valve body and the wall of the valve shaft on both the upper and lower faces of the primary sealing member, and a spring associated with the valve bore for maintaining force on the primary sealing member in order to maintain the primary seal. The invention also provides an embodiment including components for retrofitting an existing valve by replacing packing with a plurality of sealing wafers and a metal sealing ring, which together form the horizontal fluid seal among the components.

10 Claims, 15 Drawing Sheets

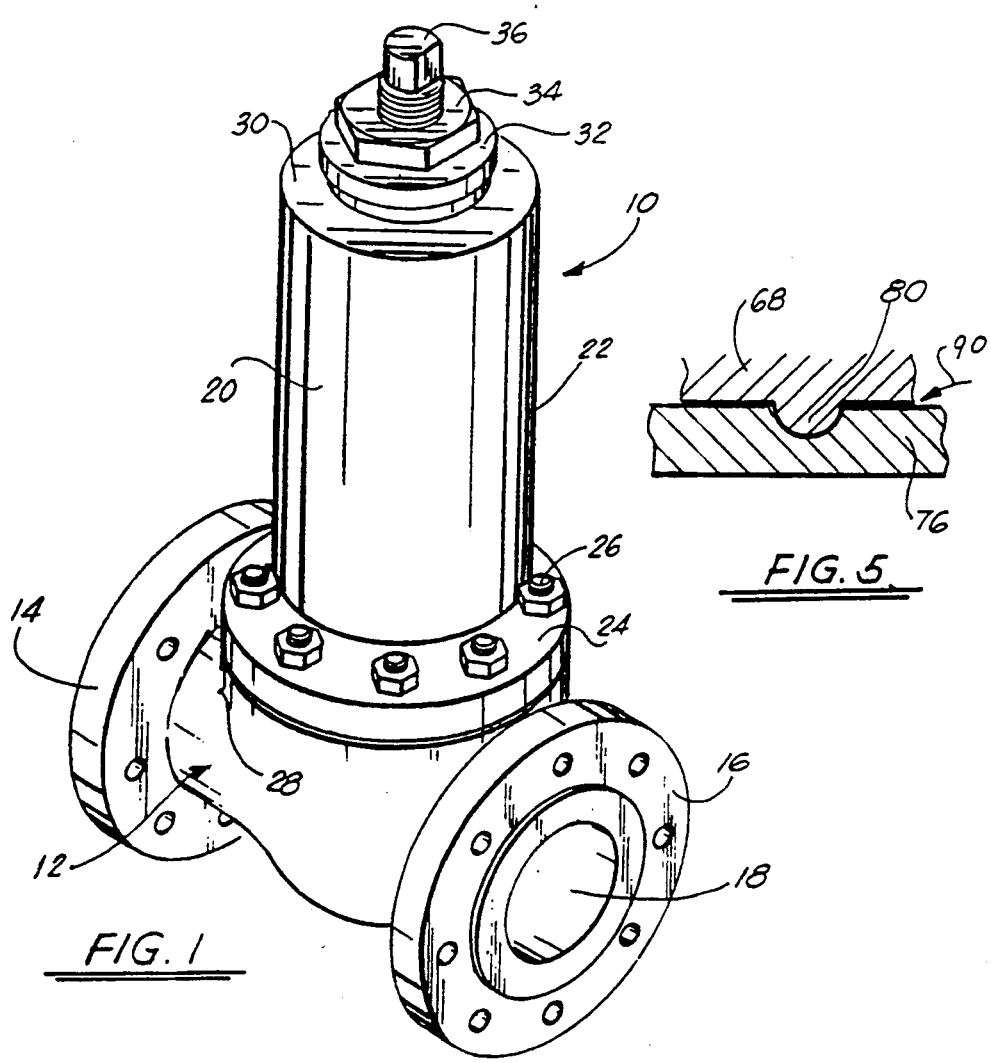
FIG. 1
FIG. 5
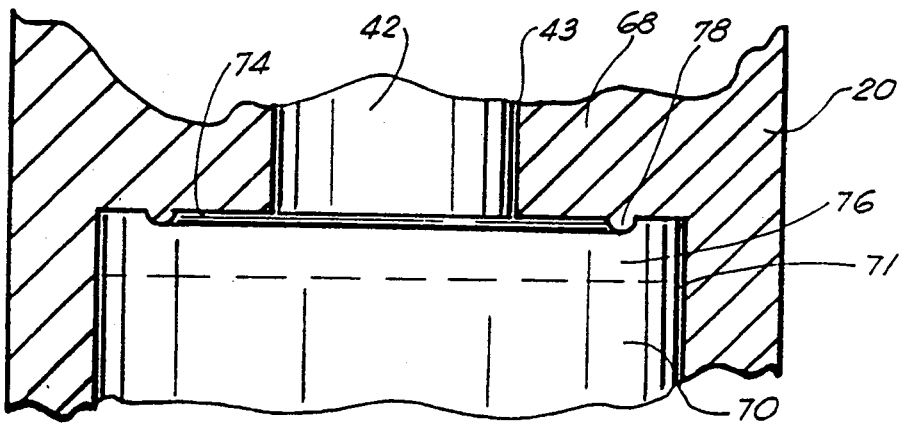
FIG. 4

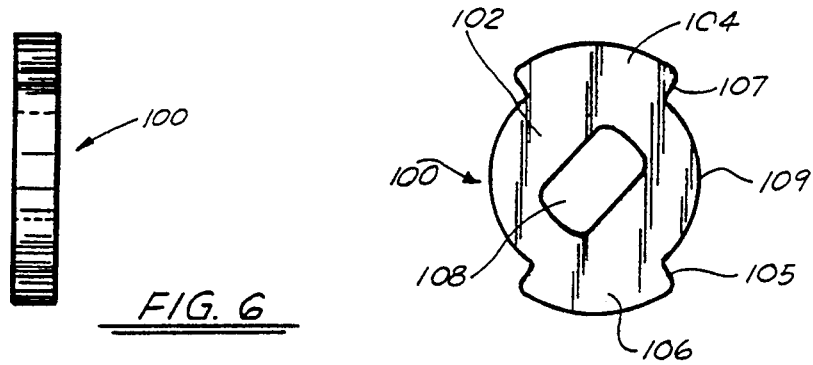
FIG. 6
FIG. 7
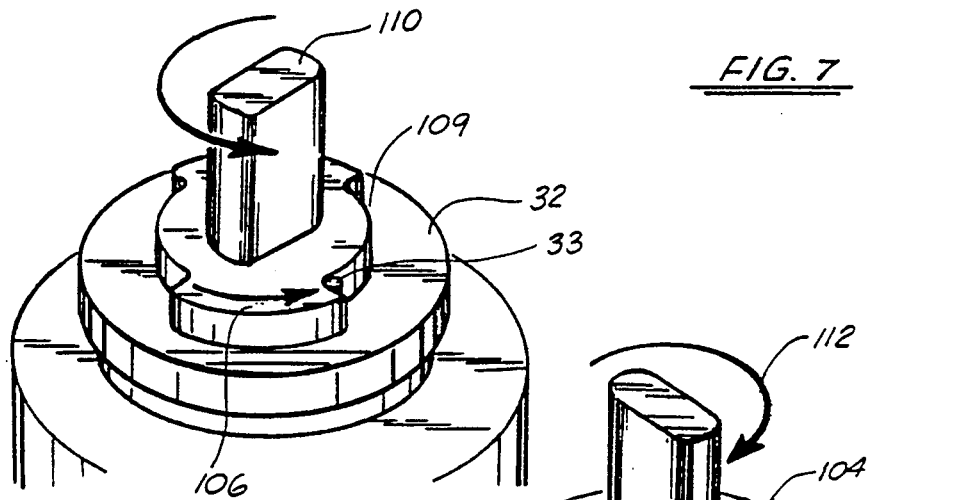
FIG. 8
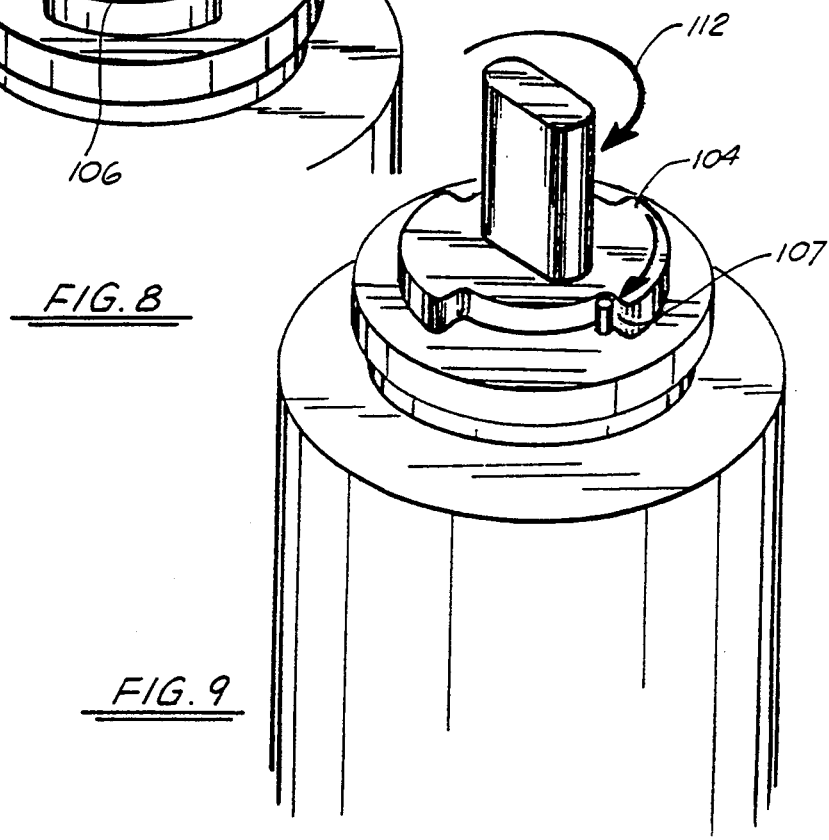
FIG. 9

VALVE SEAL APPARATUS

This is a continuation-in-part of co-pending U.S. patent application Ser. No. 07/769,056, filed Sep. 30, 1991 entitled "Valve Seal Apparatus", by the same inventor, U.S. Pat. No. 5,170,991, which was a continuation-in-part of U.S. patent application Ser. No. 07/552,250, filed Jul. 16, 1990, by the same title, and which has issued as U.S. Pat. No. 5,052,658, on Oct. 1, 1991, both applications and patent hereby incorporated by reference.

BACKGROUND OF THE INVENTION

1. Field Of The Invention

The present invention relates to valves. More particularly, the present invention relates to a horizontal seal positioned in a valve body so as to reduce or eliminate emissions from various ball, plug, or butterfly valves, which normally rotate 90° between full open or fully closed to allow or stop the flow of the fluid in the line.

2. General Background

Due to the hazards that are being addressed in today's environment, especially in the area of plant or inadvertent gaseous emissions from plants or the like, there is increasing awareness which is devoted to assuring that greater caution is undertaken in the construction of plants and the lines in plants which carry hazardous material, in order to prevent pollution problems which plague the chemical industry. One particular type of hazard is through inadvertent atmospheric emissions, which the chemical industry is attempting to reduce pollutants from the air at the source of the emission i.e., the chemical plant itself. It has been found that most fugitive emissions from chemical plants generally originate from leaks in the lines, such as leaking flanges, pump seals, or packing that are in valves. In the area of leaks in pump seals, these are corrected through more efficient seal designs.

In general, leaks in flanges are controlled by utilizing an additional welded pipe rather than having to join segments of pipe in flanged joints. In the case of vapor leaks, that may escape through valves, this type of leak may be the most difficult to control, in view of the fact that in most cases, the leak has occurred in the packing gland of the valve prior to the need for adjustment being noted. For purposes of explanation, the packing gland is usually a material that is contained within the valve body, and would usually surround the valve stem and would be compressed between the body of the valve and the stem and would serve as a seal for fluids that may seep around the valve stem, and theoretically would prevent the leak from proceeding past the packing material. However, in view of the fact that the packing material often times is inadequate, and only forms a vertical seal, and may not be effecting a complete fluid tight seal, the fluid or gas is able to leak past the packing material around the stem space and out of the valve into the atmosphere.

It would therefore be a desirable feature in what are termed "90° valves" such as ball, plug or butterfly valves, to incorporate a simple, inexpensive valve seal that would seal horizontally in order to reduce or totally eliminate fugitive emissions. Such a seal in combination with a 90° valve is disclosed in the present invention.

In addition, the present invention discloses the horizontal valve seal being utilized in different valves such as a full turn valve, a double lined valve, such as a Teflon lined valve, a flat headed or uni body valve, a gate valve, including a knife edge gate valve, and other types of valves. In addition, the sealing arrangement in various types of valves may include a double horizontal seal as will be more fully explained.

The present inventor is the named inventor in U.S. Pat. No. 4,671,314, entitled "Flow Line Sampler Valve Apparatus", which discloses a stationary sealing wafer which served as a seal against the flow of fluids out of the valve other than through the valve flow line. The wafer was constructed preferably of Teflon material for carrying out the sealing function.

SUMMARY OF THE PRESENT INVENTION

The present invention provides a solution to the problems in sealing 90° valves in a simple and straight forward manner. What is provided is a 90° valve boltingly attached to a fluid line, of the type having a substantially cylindrical valve body, the valve body including a continuous bore therethrough, and housing a valve shaft extending through the valve body, so the valve shaft extends from the upper end of the valve body, and a handle is positioned thereupon. In most cases, the valve body would further include a spring within an enlarged bore of the valve body, a packing material in the upper portion of the valve shaft, and a compression nut forming a seal against the packing material for attempting to serve as a means for eliminating leakage around the valve stem. The preferred embodiment of the present invention would further include a wafer positioned along the valve stem, the wafer comprised of PTFE material (Teflon), and interposed between a shoulder portion of the valve body, and an enlargement of the valve stem. There would be further included a ridge built into the lower surface of the valve body shoulder, for compressing into the face of the wafer. This compression by the ridge into the upper face of the wafer transmits into a force directed through the wafer to effect a seal between the polished upper surface of an enlargement of the valve stem and the lower surface of the wafer to prevent any fluid from traveling past that point, and effect a seal on either face of the wafer. In a second embodiment, the spring would be positioned in the bore of the valve below the valve stem enlargement, so that the spring would be "in the process" as opposed to being on the outside of the process as stated earlier.

In summary, the original purpose of the research in this field was to develop a valve stem seal which did not rely on sealing the shaft wall and the annular wall of the valve bonnet. The method selected to accomplish this end was to place the seal on an enlarged collar formed around the shaft. The high pressure ring seal which was developed is able to withstand pressures in excess of 40,000 pounds. This is achieved by controlling the ring surface area to a structurally sound minimum area and imposing maximum spring force. Due to the small size of the steel ring itself, a secondary seal to protect the ring is desirable in order to protect the ring from corrosive attack. The secondary seal is achieved by controlling the total surface area of the shaft collar when using the predetermined force applied by the spring that originated the primary seal.

As an example of the sealing system in use, a ring seal having a total surface area of 0.10 inches when compressed into the wafer with a spring force of 4,000 pounds will create a 40,000 pound seal. The same spring load of 4,000 pounds will create a secondary seal of almost 8,000 pounds if the total shaft collar surface is limited to 0.50 inches. Flexible gasket materials must be compressed to a significant degree before any seal at all can be affected. In the case of Teflon, this compression is 1,200 pounds. For flexible graphite it is 2,500 pounds. Therefore, a spring load of a 2,000 pound force on a shaft collar with one square inch of total surface would not seal at all with a graphite wafer.

With a Teflon wafer, the secondary seal would only be 800 pounds. It is important to have a seal that is fire proof. Graphite is fire proof while Teflon is not.

The secondary seal is produced by controlling total surface area of the shaft collar. The secondary seal is the only manner to protect the primary ring seal from corrosive attack, and is therefore a planned and integral part of the invention. It is desirable to use a full range of flexible wafer material and Teflon, graphite or metal are all feasible materials. The invention includes use of any flexible wafer material.

An additional feature of the invention is what would incorporate an emergency shut-off, which achieves complete positive closure of the seal faces in the event of wafer or spring failure. This unique feature can be triggered outside of the valve itself and can be done manually by the operator. Inspection of the various seal configurations will show that when the spring is overpowered the shaft collar will compress the wafer into a double full face gasket subjected to the full force and power that can be applied to the shaft threads. This tremendous amount of available force can even create a metal to metal seal if the wafer is decomposed. It is an extremely important feature if the valve becomes involved in a fire or the operation cannot be shut down because of a leaking valve.

As additional embodiment of the invention would address the retrofitting of existing valves through the placement of a metal ring inserted around the valve shaft, in combination with flexible wafers such as teflon wafers, with the metal insert ring incorporating a raised ring on either the upper or lower surface for forming a horizontal seal between the wafers which are positioned above and below the ring resting on the shoulder of the shaft. This insert would replace existing sealing bearings which are found in these types of valves.

Therefore, it is the principal object of the present invention to provide a 90° ball, plug, or butterfly valve, including a sealing wafer interposed in the valve bore, for effecting a horizontal mechanical seal between the process and the valve bore, in order to prevent accidental fluid flow up around the valve stem;

It is a second object of the present invention to provide a primary mechanical seal between the process and the conventional packing gland of a 90° valve, with the packing gland serving as a secondary seal against fluid flow along the valve shaft;

It is an additional object of the present invention to provide a valve seal that can seal up to 40,000 pounds-per-square-inch (psi), and prevent any inadvertent leakage of gas or liquid along the valve shaft to the atmosphere;

It is still a further object of the present invention to provide a horizontal seal in addition to the packing gland in a 90° valve, which would place the mechanical seal as the primary seal between the process and the conventional packing gland; and It is still a further principal object of the present invention to provide a horizontal seal in addition to a packing gland in various other types of valves, which would place the mechanical seal as the primary seal between the process and the conventional packing gland, and may place a second horizontal seal within the valve in order to seal off flow within a valving mechanism.

It is still a further principal object of the present invention to provide a horizontal seal in various types of valves, which is formed by the replacement of bearings around the valve shaft with a metal ring in combination with teflon wafers, so that a raised portion or portions of the metal ring seals against the surface of the wafers, and forms a horizontal seal in the retrofitted valve.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 illustrates an overall perspective view of a typical 90° valve which would utilize the present invention;

FIG. 4 illustrates a partial cut-away view of the enlarged bore that would house the valve seal in the present invention;

FIG. 5 illustrates a detailed view of the sealing function of valve seal of the present invention;

FIGS. 6 and 7 illustrate in side and front view respectively the typical stop mechanism in the present 90° valves;

FIGS. 8 and 9 represent respectively the functioning of the stop member in relation to the rotation of the valve shaft during use of the valve;

DETAILED DESCRIPTION OF THE PREFERRED EMBODIMENT

Figure 2:
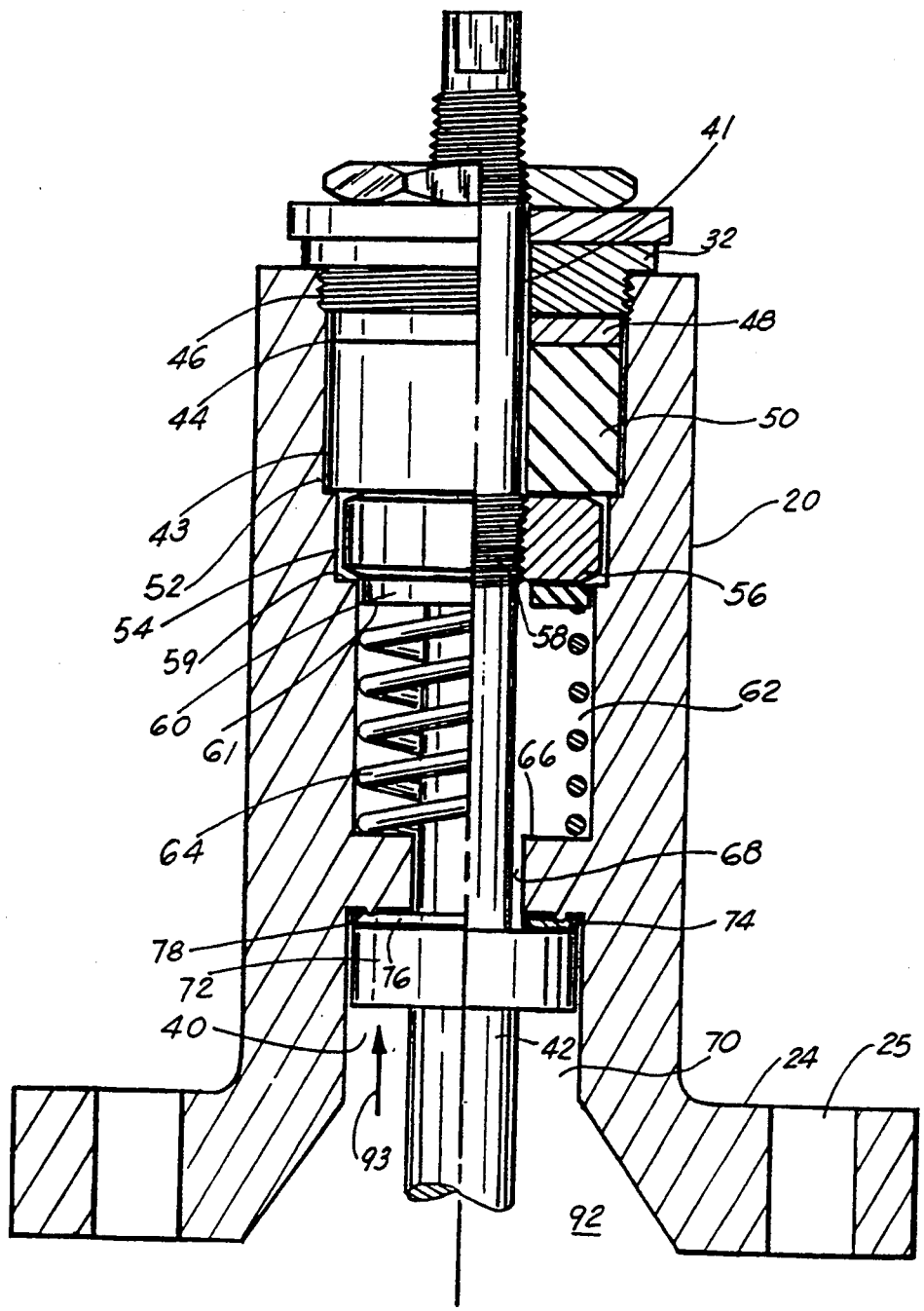
FIG. 2 illustrates a partial cross-sectional view of the preferred embodiment of the apparatus of the present invention illustrating the valve seal maintaining the spring and packing material outside of the process.

FIGS. 1 through 9 illustrate the preferred embodiment of the apparatus of the present invention utilized in the type of valve that is illustrated by the numeral 10. As illustrated, valve 10 is mounted upon a fluid flow line represented by fixture 12, the type of fixture having a first end flange 14 and second flange 16 which boltingly mount onto a flow line for allowing the passage of fluids or gases through the flow bore 18 as illustrated. Fixture 12 would have mounted upon it valve bonnet 10, valve bonnet 10 including a body 20, having a continuous annular side wall 22, with the base portion of body 20 including a circular flange portion 24 which would accommodate a plurality of bolts 26 for bolting onto the top surface 28 of fixture 12.

Of course, in operation, fixture 12 would have a bore in the top portion of fixture 12, for accommodating the valving element of valve 10 to operate within flow bore 18. In most cases, valve 20 is referred to as a "90° valve", with the valving element contained within flow bore 18 being either a ball valve element, plug valve element, or a butterfly-type valve. In any of these particular cases and perhaps others, the present invention would function, as will be illustrated further.

As further illustrated in FIG. 1, valve body 20 contains an upper face 30, wherein a top plug 32 would be threaded into the valve body 20, with a hex-nut 34 mounted thereupon. There is included an upper extending member 36, which represents the upper end of the valve shaft that will be discussed further.

Turning now to the internal structure of the valve, in utilizing the present invention, reference is made particularly to FIG. 2. As illustrated in FIG. 2, again there is illustrated in cross-sectional view valve body 20, having a continuous flange portion 24, which would include a plurality of bolt holes 25 for accommodating bolts 26, to be boltingly engaged upon the body member 12, as was illustrated further. Furthermore, valve body 20 would include a continuous bore 40 therethrough, with bore 40 including a valve shaft 42.

As illustrated, bore 40 includes an upper enlarged counterbore 44 with the upper end of counterbore 44 threaded at 46, for accommodating the threaded cap 32 that was referred to earlier.

Counterbore 44 would also house a metal washer 48 directly below cap 32, and a quantity of packing material 50 that is a flexible type of gasketing material, that would sealingly engage against the inner wall 43 of counterbore 44, and the annular wall 41 of valve shaft 42, which is extending through bore 40, as illustrated. Counterbore 44 would then provide a shoulder portion 52, upon which forms a reduced counterbore 54 with reduced counterbore 54 housing a compression nut, such as a spider nut 56, which is threaded along the threaded portion 58 of valve shaft 42, the function of which will be described further. Spider nut 56 housed within second counterbore 54 rests upon a shoulder 59, which then leads into a third enlarged counterbore 62, wherein a coil spring 64 is housed. The upper portion of spring 64 engages against the undersurface 61 of a metal washer 60, and the lower portion of spring 64 engages upon an annular shoulder member 66 formed by the valve body 20 to produce a reduced bore 68 upon which shaft 42 continues.

The bore 68 would then expand into a fourth enlarged counterbore 70, wherein an enlarged annular portion 72 of the valve shaft 42 is formed. Enlarged annular portion 72 has a flat polished upper face 74 which accommodates the underside of a flexible wafer member 76, which would preferably be constructed of polytetrafluoroethylene (PTFE or Teflon), which functions as the primary sealing means in the valve as illustrated (Teflon is a registered trademark of the DuPont Corporation).

Structurally it should be noted that the undersurface 78 of shoulder member 66 provides a continuous annular raised ring portion 80 (see FIG. 4 for details) which is formed in the lower surface 78 of shoulder 66 and provides a means for pressing into the flexible sealing member 76, and thereby, in addition to effectively forming a gasket seal along the upper surface 74 of wafer 76, transmits a downward directed force through the compression of wafer 76 along the annular raised portion 80, and creates a seal along the lower annular surface 75 of flexible wafer 76 between that portion of the flexible wafer 76 compressed via ring portion 80, and the polished upper face 74 of annular portion 72. The seal between the lower face of wafer 76 and the upper surface 73 of annular portion 72 is the type of seal which would allow rotation of the shaft 42 against the stationary lower face 75, of wafer 76 when operation of the valve is undertaken.

It should be noted that spider nut 56 when tightly engaged forces the contraction of spring 64, which in turn would direct the upward force on wafer 76, thus effecting the gasket seal between the lower surface 78 of shoulder member 66 through raised ring portion 80. However, and more importantly, as was stated earlier, the compression of wafer 76 by the raised ring portion 80 introduces an annular ring of force between the lower surface 75 of wafer 76, and the flat polished upper face 73 of enlarged annular portion 72, a seal along that point to prevent fluid from flowing thereby.

As was discussed earlier, in FIGS. 4 and 5, it should be noted that FIG. 4 in fact illustrates a partial view of valve body 20, wherein annular shoulder 68 is protruding inwardly to a point adjacent valve shaft 42. As was stated earlier, there is formed an annular protrusion or raised area 80 formed within the lower surface 78 of annular shoulder 68, so that when the flexible wafer 76 as illustrated in phantom view, is contained within counterbore 70, the annular raised portion 80 would protrude and would bite into the surface of member 76 thus effecting the horizontal seal against flow of fluids between the inner wall 71 of counterbore 70, and the passage between the inner wall of shoulder portion 68 and the outer wall 43 of shaft member 42, thus preventing any fluid flow past that point.

Furthermore, as illustrated more clearly in FIG. 5, when wafer 76 is compressed by the intrusion of ring 80 into the upper surface of upper surface 74 of wafer 76, the compression of the wafer along phantom Arrow 77 imparts a downward directed force in that direction, thus creating a fluid tight seal at 79 between the upper polished face 73 of annular portion 72 and the lower face 75 of wafer 76. This sealing means directed in this annular fashion creates a horizontal seal for preventing fluid from flowing in the direction of Arrow 81 past point 79 as fluid may travel between wafer 76 and enlarged annular portion 72.

In this particular embodiment as illustrated in FIG. 2, is referred to as the embodiment which maintains the spring member 64 and the packing material 50 outside of the process, in view of the fact that the process fluid would be contained within area 92, which represents that area in which the lower portion of the valve shaft 42 has the actual valving member and which is protruding into the fluid passage that the valve is intended to restrict when necessary.

Therefore, any fluid which would be moving upward in space 92 in the direction of Arrow 93 would be precluded from traveling any further than wafer 76 and would therefore be prevented from moving into counterbore 62 and any other portions of the valve above the primary sealing element 76 as illustrated.

Figure 3:
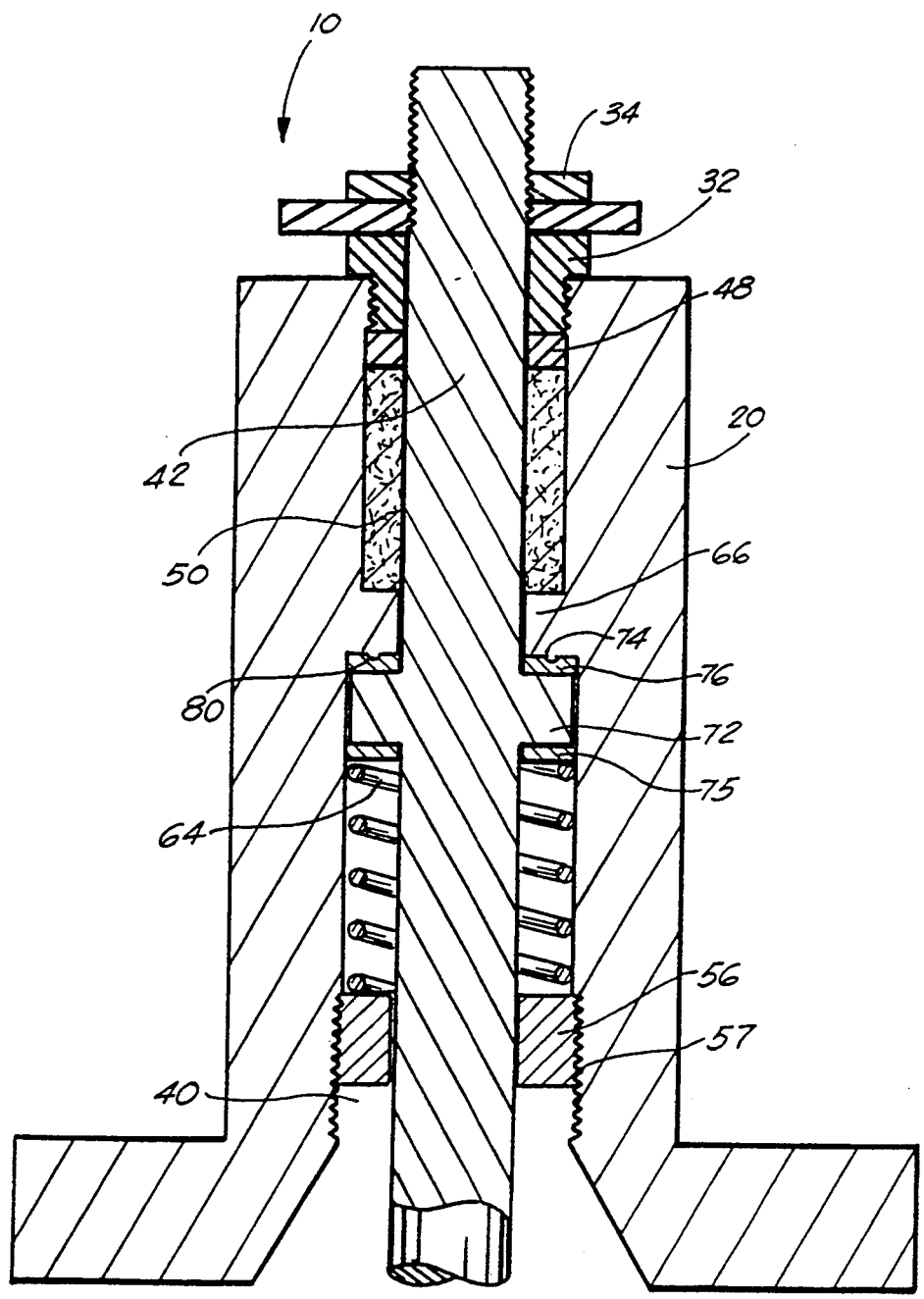
FIG. 3 illustrates a full cross-sectional view of the apparatus of the present invention wherein the valve seal is positioned with the spring inside of the process.

FIG. 3 likewise illustrates basically the same type of valve having a valve bonnet 20, the valve shaft 42 housed within the valve bore 40, and likewise having the hex-nut 34, the valve cap 32, with the valve cap 32 threadably engaged into bonnet 20 on the upper end of the bore 40, and pressing against a steel compression ring 48. Directly below packing material 50 there would be enlarged annular shoulder portion 66 of valve bonnet 20 protruding inwardly, as in the embodiment as illustrated in FIG. 2. Directly beneath annular portion 66 there would be located the flexible PTFE wafer 76, of the type that is illustrated in FIG. 2. Again, the undersurface of annular shoulder 66 would be provided with a raised ring portion 80, as in the embodiment as seen in FIGURE 2, which would function in the same manner as earlier discussed. The wafer 76 would rest upon the upper polished surface 74 of shaft enlargement 72, again as seen in FIG. 2. Directly below the enlarged portion 72, spring 64 would be located pressing upwardly against the under side of enlarged portion 72. Directly beneath spring 64 there would be included the spider nut 56 threaded into the wall of body 20 via threads 57, so that as spider nut 56 is threaded thereupon tightly, it would force spring 64 to exert force upwardly against the washer 75 and enlarged portion 72, thus causing wafer 76 to be compressed between the annular shoulder 66 and the enlarged portion 72. The compression of wafer 76 via ring portion 80, would effectuate the same type of seal that was discussed previously in portion 72, and therefore need not be repeated.

This particular embodiment of the valve seal apparatus 10 provides that spring 64 is located "in the process". This simply means that with the process fluid contained in space 92, and perhaps traveling in the direction 93, the fluid may have the opportunity to travel in the space between the valve body and the valve stem and move into the enlarged counterbore 62 in which the spring 64 is placed, but would encounter again the sealing means 76 as it attempted to travel between the counterbore 62 and that area of the valve shaft along the sealing means 76.

In operation, it should be noted that wafer means 76, in carrying out its primary function, would be substantially stationary and would not move as the rotation of the valve stem occurs. Furthermore, in theory the sealing mechanism of the wafer accommodates a seal from the vertical to the horizontal. That is as noted in the packing material which attempts to seal between the inner wall 43 of counterbore 44 and the packing material, this particular primary sealing means i.e., wafer 76 provides that the seal be transferred to a horizontal seal along the surface between the sealing wafer and the upper structural component. That being the case, it provides a more effective seal, a seal which virtually eliminates any possibility of leakage that is not provided in the use of packing material only.

FIGS. 7 through 9 illustrate a feature of the valve for providing a means for ascertaining when the valve has been moved between open and closed positions. As noted, FIGS. 6 and 7 illustrate the stop member 100 which includes a substantially circular body portion 102 with a pair of flared stop portions 104 and 106 which are substantially 180° apart. Stop member 100 is provided with a substantially rectangular opening 108 which would slidably engage upon the substantially rectangular upper portion of the shaft 110, and would rest upon the cap member 32. As seen, cap member 32 would be provided with an upward protruding stem member 33, which would engage a face 105 of first stop 106, but yet would be free to travel within the space 109 between the second face 107 of stop member 104.

Therefore, as seen in FIG. 8, when the stop member 33 is abutting against the face 105 of stop 106, theoretically the valve would be totally open. Upon rotation of the valve stem in the direction of Arrow 112, the stop member would then be free to move within space 109 and would then engage the face 107 of stop 104 and therefore one would know that the valve is totally closed.

FIGS. 10 through 15 illustrate the horizontal seal concept in a valve being utilized in various types of valve bodies using either a single horizontal seal or a double horizontal seal.

Figure 10:
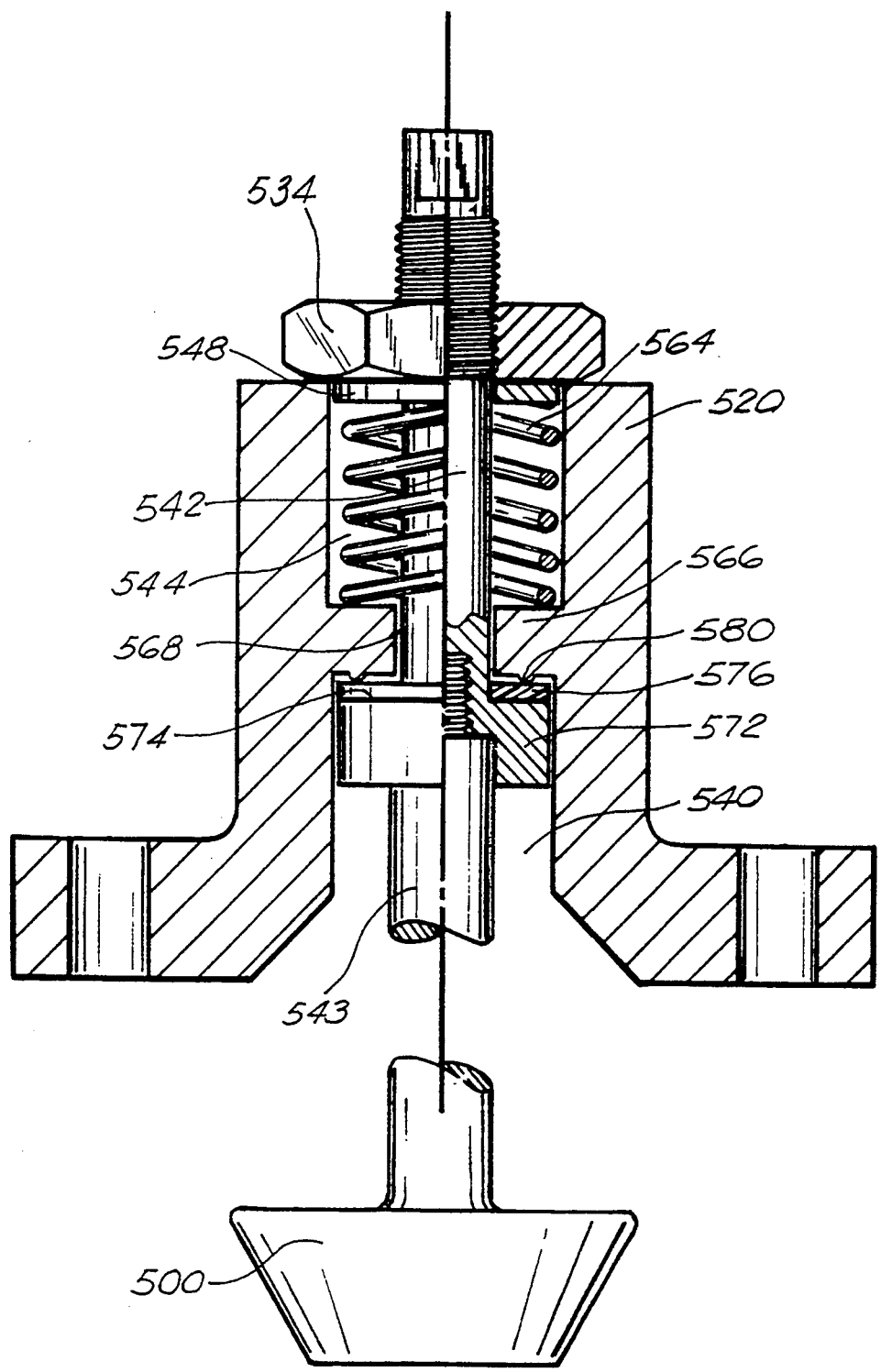
FIG. 10 illustrates a horizontal seal being utilized in a knife edge gate valve.

In FIG. 10 there is illustrated valve bonnet 520. Again, where there is included a valve shaft 542 within a bore 540 including a reduced bore 568 and an upper enlarged counterbore 544, with a spring member 564 positioned between an upper metal wafer 548 held in position via a threaded hex-nut 534. The lower base of shaft 542 would include an annular shoulder 572, having a flexible Teflon wafer 576, in the preferred embodiment, positioned on the upper polished surface 574 of shoulder 572 and an upper annular shoulder 566. The lower surface of annular shoulder 566 would include a raised ring 580 which, when pressure would be applied to nut 534, ring 580 would be pressed into the wafer 576, and the sealing would take place along the upper surface 574 and wafer 576, and the ring 580 and wafer 576, as was more fully described previously in FIG. 1 through 9. This type of valve would be the type of valve that would be a plug seal valve, with the plug 500 being at the end of extended stem 543. In this embodiment, extended stem 543 could also be interconnected to upper shaft 542 via a key slot type of arrangement.

Figure 11:
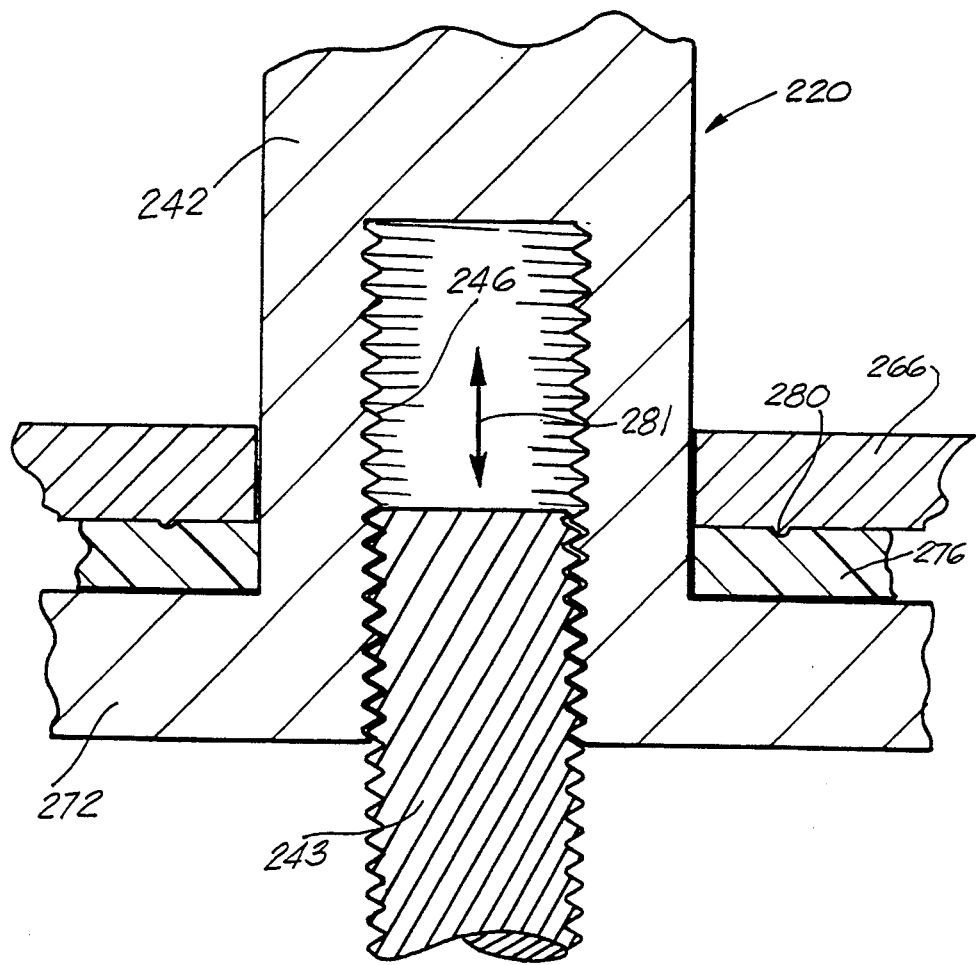
FIG. 11 illustrates a partial view of the horizontal seal being utilized in a full turn valve.

FIG. 11 illustrates in partial view a full turn valve 220, which would include an upper shaft portion 242, with a threaded lower shaft portion 243 threaded at thread 246. Again the upper portion would have an outer shoulder 272 with the valve bonnet shoulder 266 being shown in partial view. The flexible Teflon wafer 276 would be engaged therebetween to again effect a seal between the wafer 276 and the upper shoulder 266, and lower shoulder 272 via the raised ring 280 on the lower surface of upper shoulder 266. Again, a full turn valve operates with the lower stem 243 moving in the direction of Arrow 281 during the rotation of the stem 242 and would be a standard full turn valve.

Figure 12A:
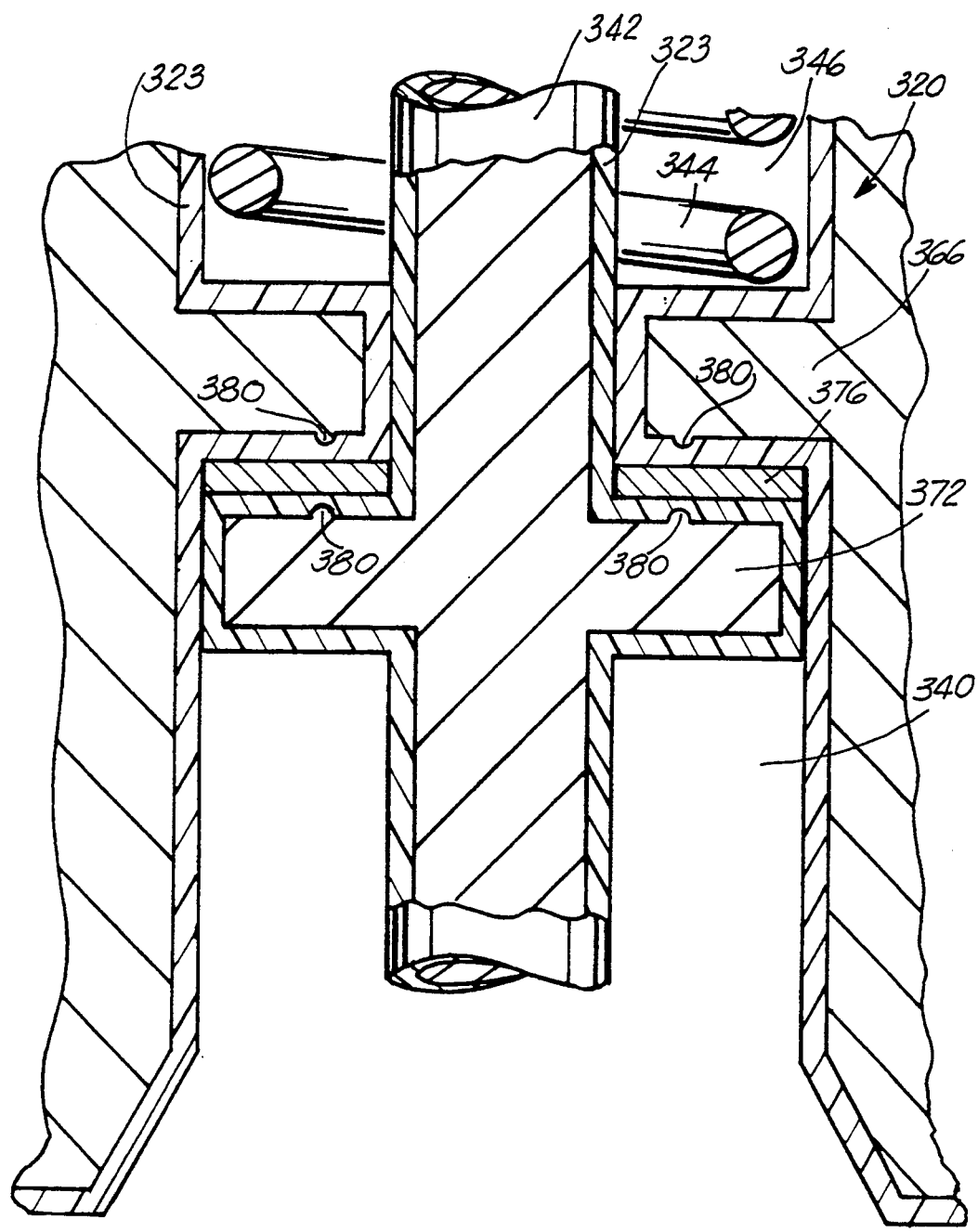
FIGS. 12A and 12B illustrates a double horizontal seal being used in a lined valve such as a Teflon lined valve.
Figure 12B:
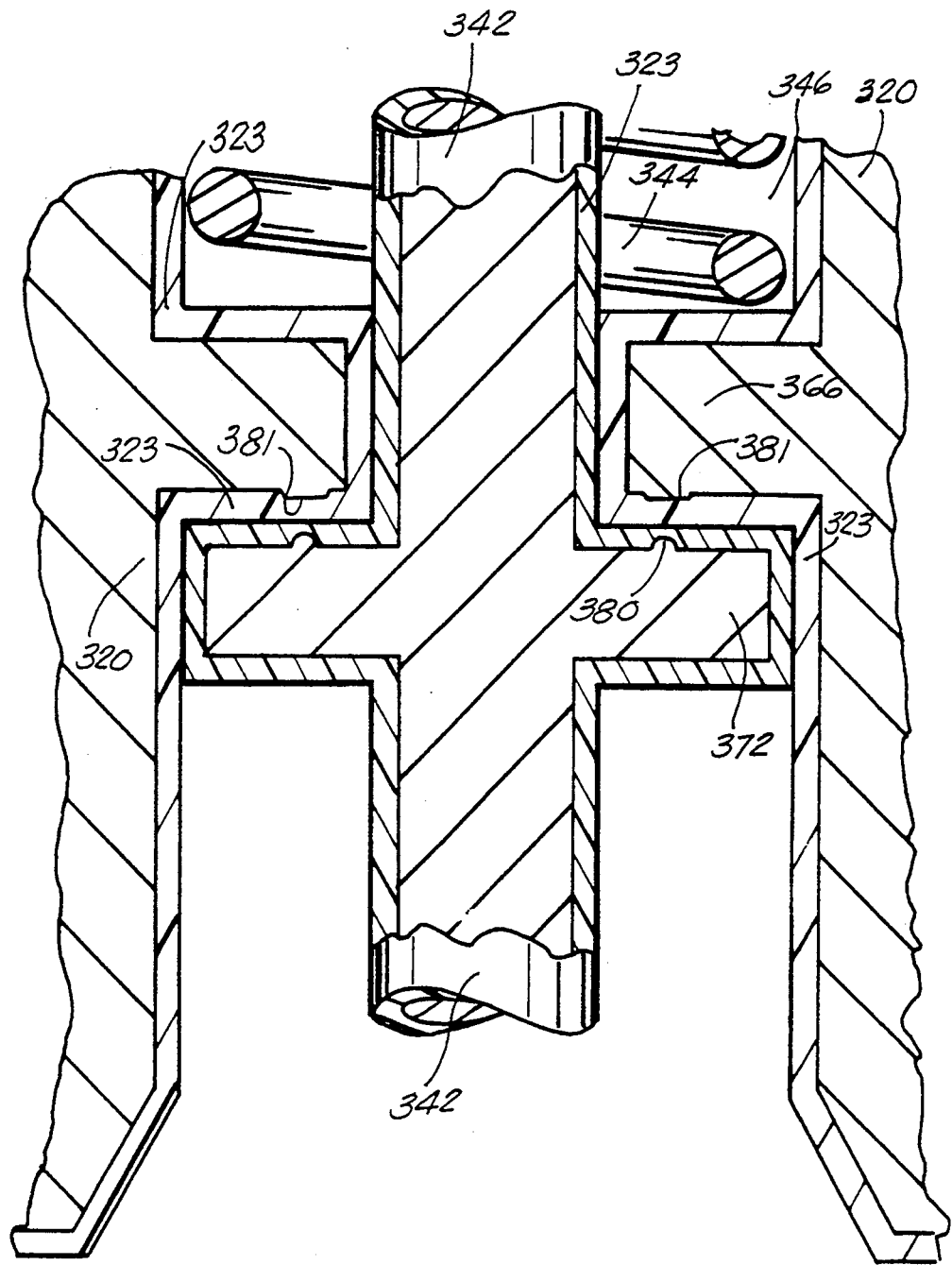

FIGS. 12A and 12B illustrate the horizontal seal concept be utilized in a Teflon lined valve. As seen in FIG. 12A, there is illustrated in partial view the valve bonnet 320, having again an upper shoulder 366 whereupon a coil spring 344 would be engaged within an enlarged counterbore 346. There would be included a valve stem 342 positioned within the bore. The valve bore 340 includes the valve stem 342 having an enlarged shoulder portion 372 which again would be positioned beneath the upper shoulder 366 of valve bonnet 320. As with the previous embodiment, again there would be included a polished wafer member 376, which in this particular embodiment would be a metal wafer. The polished metal wafer would be positioned intermediate the upper shoulder 366 and the shoulder 372 of valve stem 342. This particular valve is known as a double lined valve in view of the fact that the inner wall of the valve bonnet 320 is lined with a lining of Teflon 323 which would completely line the wall along in a the liner surface. Likewise, the stem member 342 is lined with a Teflon lining 323 which again lines the outer surface of the stem 342. Therefore, the metal wafer would be positioned intermediate the Teflon lining 323 of bonnet 320 and the Teflon lining 323 of annular shoulder 372 of valve stem 342. Each of the lower shoulder 366 and the upper surface of shoulder 372 would include an annular ring 380, each of the rings 380 positioned directly in line with one another so that as the valve stem is compress against the shoulder 366 via spring 344, the raised rings 380 compressed into the Teflon and a seal is affected between the Teflon layer 323 and the metal wafer 376 in order to effect a double horizontal seal in the Teflon lined valve. This type of valve is used in particularly corrosive conditions.

FIG. 12B illustrates in effect the same type of valve as in FIG. 12A and with the same components as earlier noted. The difference is that the upper raised ring 380, rather than being a raised semi-circular ring comprises a truncated ring having a flat face 381 which bites into the Teflon layer 323 but would in effect create the same type of seal when utilized in the same manner as the valve as indicated in FIG. 12A.

Figure 13:
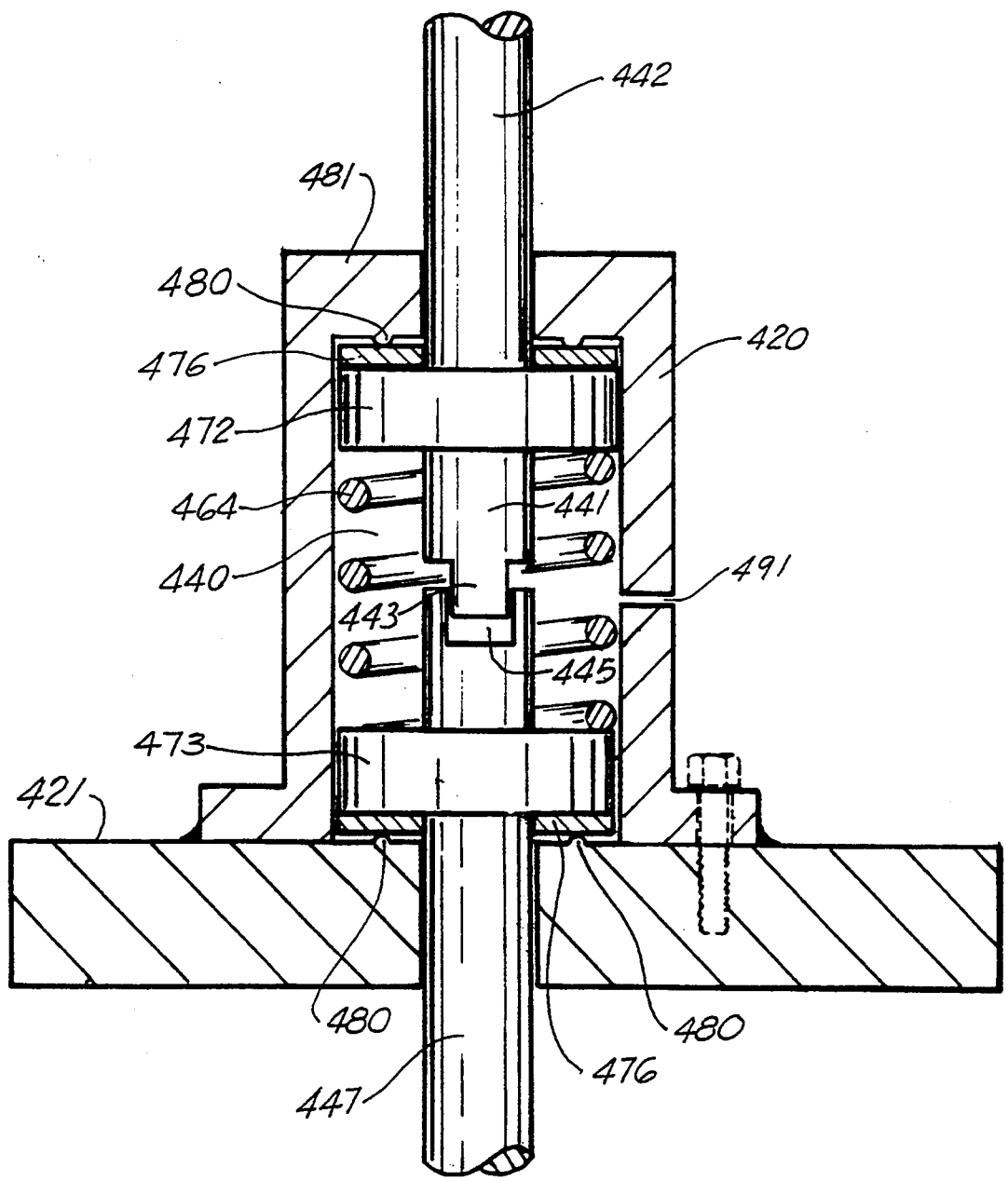
FIG. 13 illustrates a cross-sectional view of the double horizontal seal being utilized in a uni-body valve.
Figure 14:
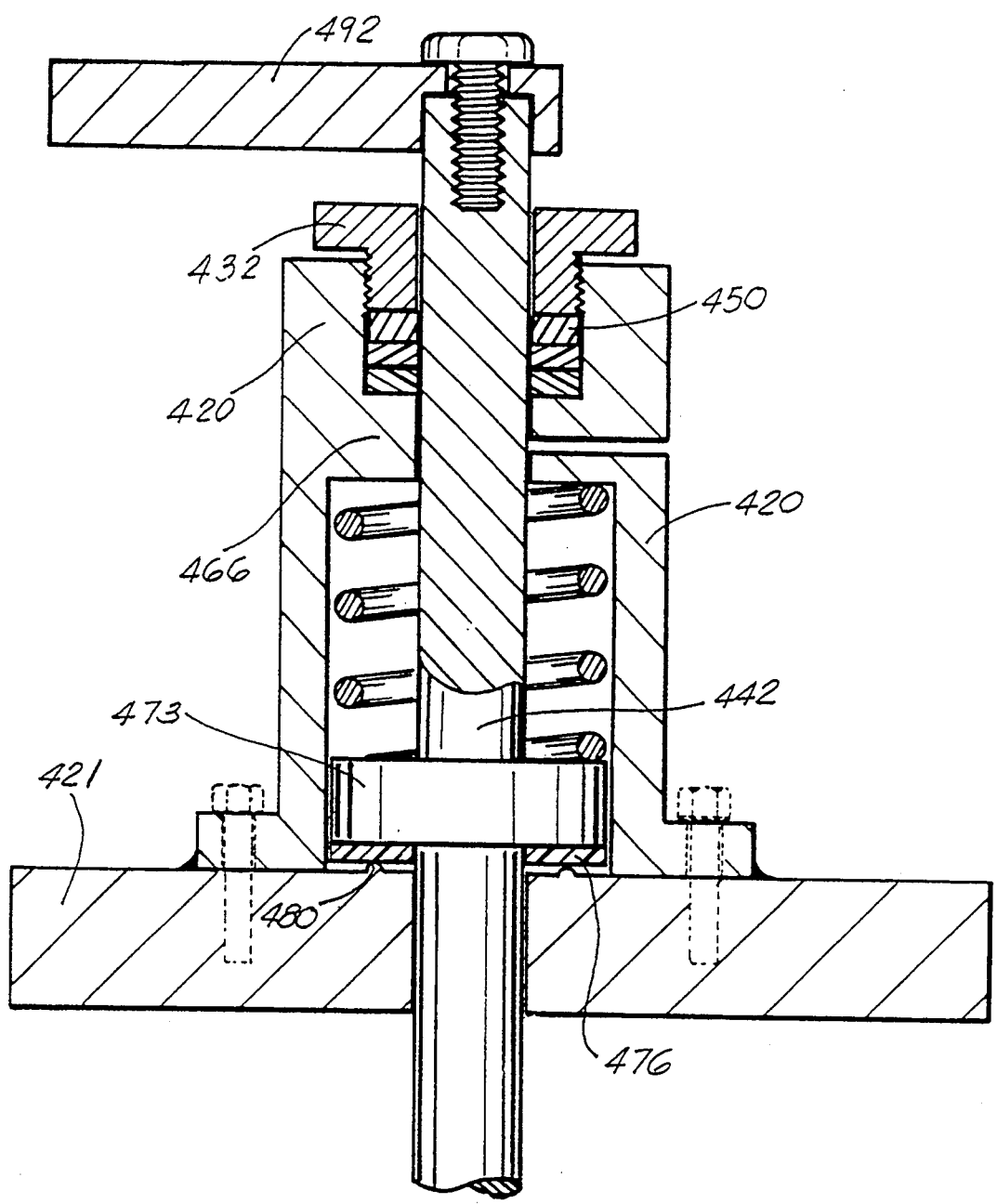
FIG. 14 illustrates a cross-sectional view of the horizontal seal being utilized in a uni-body valve with a packing gland incorporated therein.

FIGS. 13 and 14 illustrate two embodiments of what is known as a uni-body valve in view of the fact that the valve bonnet 420 in either of the valves is a unitary bonnet which is attached via welding or the like or bolting or the like to the surface 421 upon which the valve bonnet is resting. As noted, valve bonnet 420 again houses an upper stem member 442 having an enlarged shoulder portion 472 with stem member 442 positioned within an annular bore 440 as illustrated. The lower end 441 of valve stem 442 has a key 443 which engaged into a slot 445 of a lower stem 447 with the lower stem likewise having a second annular shoulder portion 473 thereupon. Contained within bore 440 is a coil spring member 464 which is interposed between the upper shoulder portion 472 and the lower shoulder portion 473. Positioned between the upper face 481 of bonnet 420 and the upper shoulder 472 there is included a first flexible wafer made of Teflon material 476 with again the wafer 476 being compressed via a circular ring 480 biting into the upper surface of the wafer 476 and sealing along the upper surface and the lower surface engaging the upper polished surface of shoulder portion 472. The same sealing arrangement occurs between the lower annular shoulder portion 473 having a wafer 480 positioned between the lower surface of annular shoulder portion 473 and the upper surface of the base 421. Base 421 would include an annular raised sealing ring 480 which would likewise engage into the wafer 476 and would effect a seal between the shoulder portion 473, the wafer 476, and the base 421. Again, this type of sealing arrangement is more fully described in the earlier embodiments in FIGS. 1 through 9 in this application.

It should be noted that in this particular type of uni-body valve there is included a test port 491 which would allow fluid contained within bore 440 to bleed out of the bore 440 into atmosphere via ports 491 as illustrated. This is a typical double seal arrangement. In the embodiment of the uni-body valve as illustrated in FIG. 14, it is somewhat similar except for the fact that there is included a plug 432 threadably engaged within the bonnet 420 with bonnet 420 including an upper shoulder 466 having a series of packing rings 450 positioned between shoulder 466 and plug 432 to help in the sealing arrangement. But again, it should be noted that this particular uni-body valve has a single annular ring 480 interposed between the annular shoulder portion 473 of valve stem 442 and the upper surface of the base 421. As illustrated, the Teflon wafer 476 would be positioned between the base 421 and the shoulder portion 473 in order to effect a seal as described earlier. There is included also a handle member 492 which is attached to the upper end of shaft 442 which would be utilized in operating the rotation of the uni-body valve as illustrated.

Figure 15:
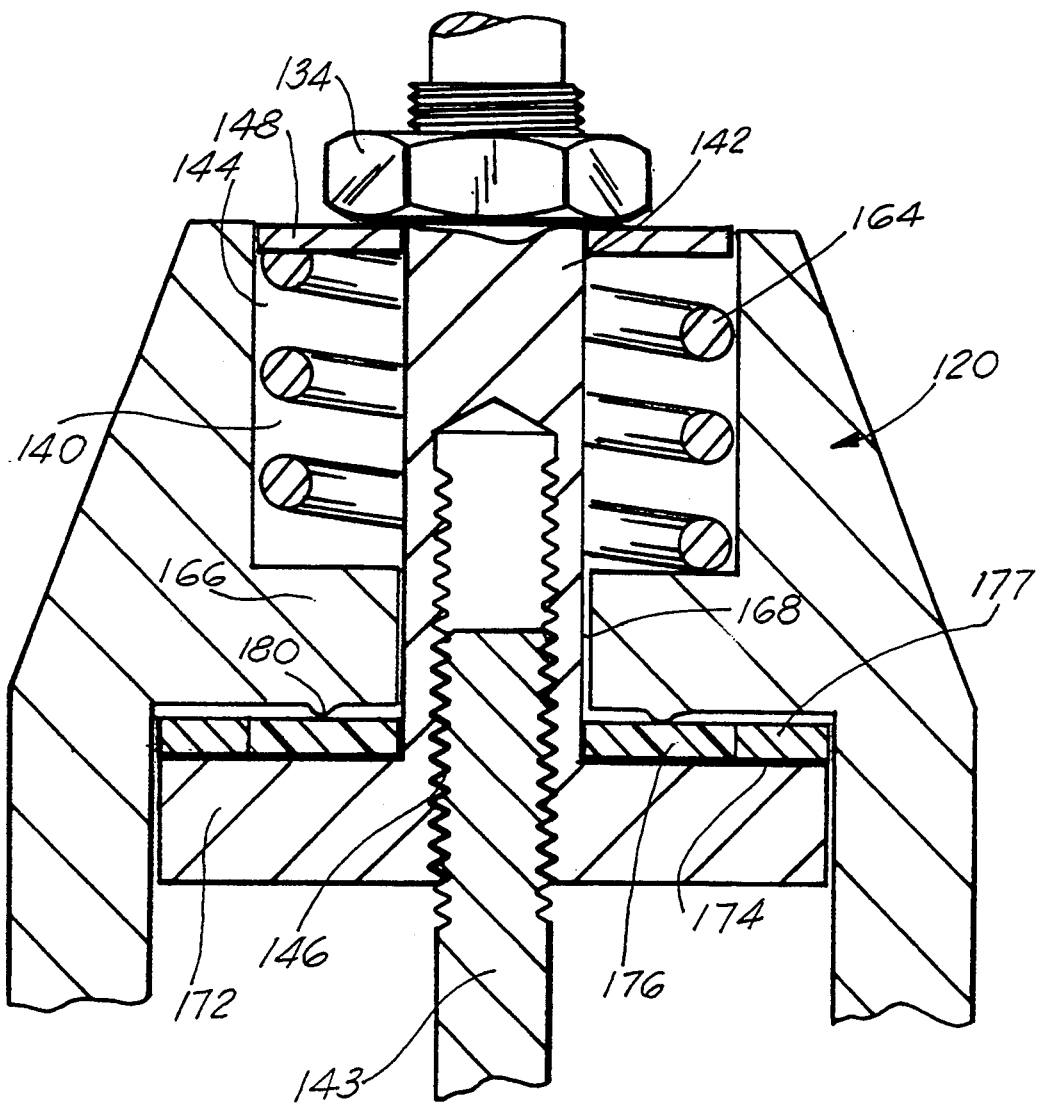
FIG. 15 illustrates cross-sectional view of the horizontal seal being utilized in a plug valve.

The last embodiment as illustrated in FIG. 15, is the embodiment utilizing the knife edge gate valve in combination with a valve bonnet 120, with the valve bonnet having a continuous bore 140 therethrough with a shoulder portion 166 along the surface of the valve bonnet 120 housing wherein there is a spring 164 positioned between the upper surface of the shoulder portion 166 and a hex-nut 134 threadably engaged upon shaft 120. Shoulder 166 would include a raised annular ring 180 of the type previously described wherein ring 180 would compress into a Teflon wafer 176, with the wafer 176 positioned upon a smooth surface of an enlarged annular portion 172 of valve shaft 142 so that as gate valve 100 is rotated, a seal is affected between the wafer 176 and the shoulder 172, wafer 176 and annular ring 180. In this particular embodiment, there would be included a metal wear ring 177 positioned around the outer edge of wafer 176 and lowered approximately 10 thousandths of an inch below the surface of the wafer 176 so as to prevent the complete crushing of wafer 176 by shoulder portion 166 as the increased pressure is placed upon wafer 176 in this particular embodiment.

In general, in the embodiments as illustrated in FIGS. 1 through 15, the type of sealing arrangement which is taught by this invention would apply to each of the types of valves illustrated in the Figures. Using FIGS. 12A and 12B as examples, having discussed the logic of the ring seal as the primary seal, it is illustrated that the ring can be placed on the shaft collar as shown in the Figures. However, in addition to the primary ring seal as illustrated, there is effected a secondary seal in the embodiment shown. For example, there can be two rings as shown, and one ring may have a larger surface area than the other. If the ring is placed on the shaft collar and one edge originates at the shaft wall, this ring becomes a shoulder portion of the shaft collar upper surface. Controlling the total surface area of the shoulder in relation to the spring pressure produces a secondary seal of lower pressure than the primary seal. Therefore, if the shaft collar diameter is the same diameter as the raised shoulder, then the upper collar surface becomes the second ring. Further pursuant of this logic indicates that if the primary ring seal on the valve bonnet is received, the secondary seal created by limiting the collar diameter in fast becomes the primary seal and will exert a force equal to the relationship between the spring pressure and surface area utilized. Since surface area increases with the square of the radius it is obvious that the collar diameter must be controlled and is a critical factor in seal design.

The flexible wafer sealing pressure doubles with increase in thickness. A Teflon gasket 1/16 inch thick requires 1200 pounds to effect any seal at all. A wafer ⅛ thick requires 2400 pounds to effect any seal at all. Therefore, wafer material of construction, thickness and the collar diameter must all interact to produce the desired sealing pressure.

In the discussion of the use of the horizontal seal up to this point, the discussion has addressed the utilization of the horizontal seal concept in valves as it would be placed on newly manufactured valves. However, one additional embodiment of the present invention is to provide a means for replacing seals or bearings in existing valves, and retrofitting the existing valve with the horizontal seal concept which would seal as effectively as the newly manufactured valves containing the horizontal seal.

Figure 16:
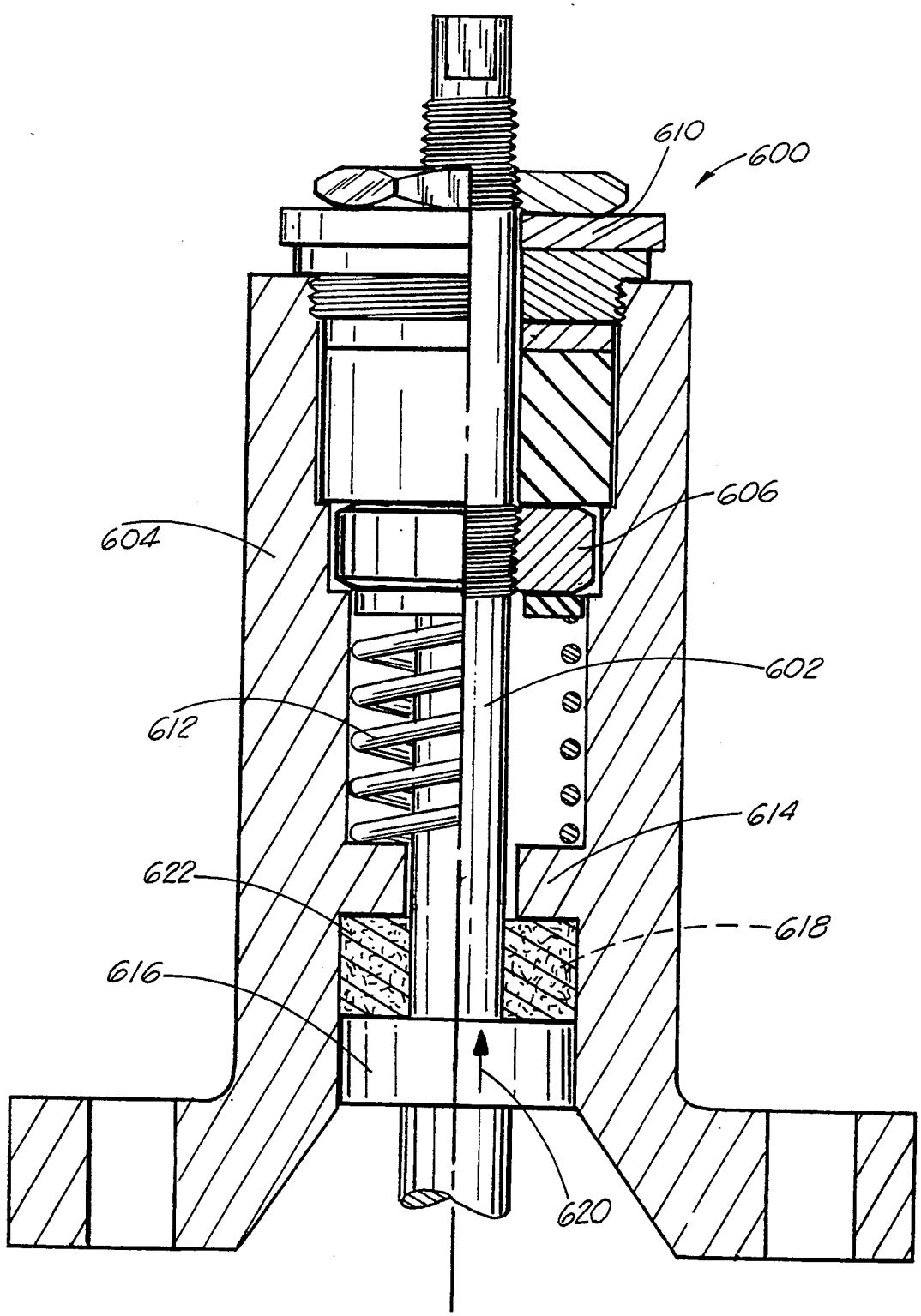
FIGS. 16 and 17 illustrate two typical valve constructions which will accommodate the retrofitted embodiment of the present invention.
Figure 17:
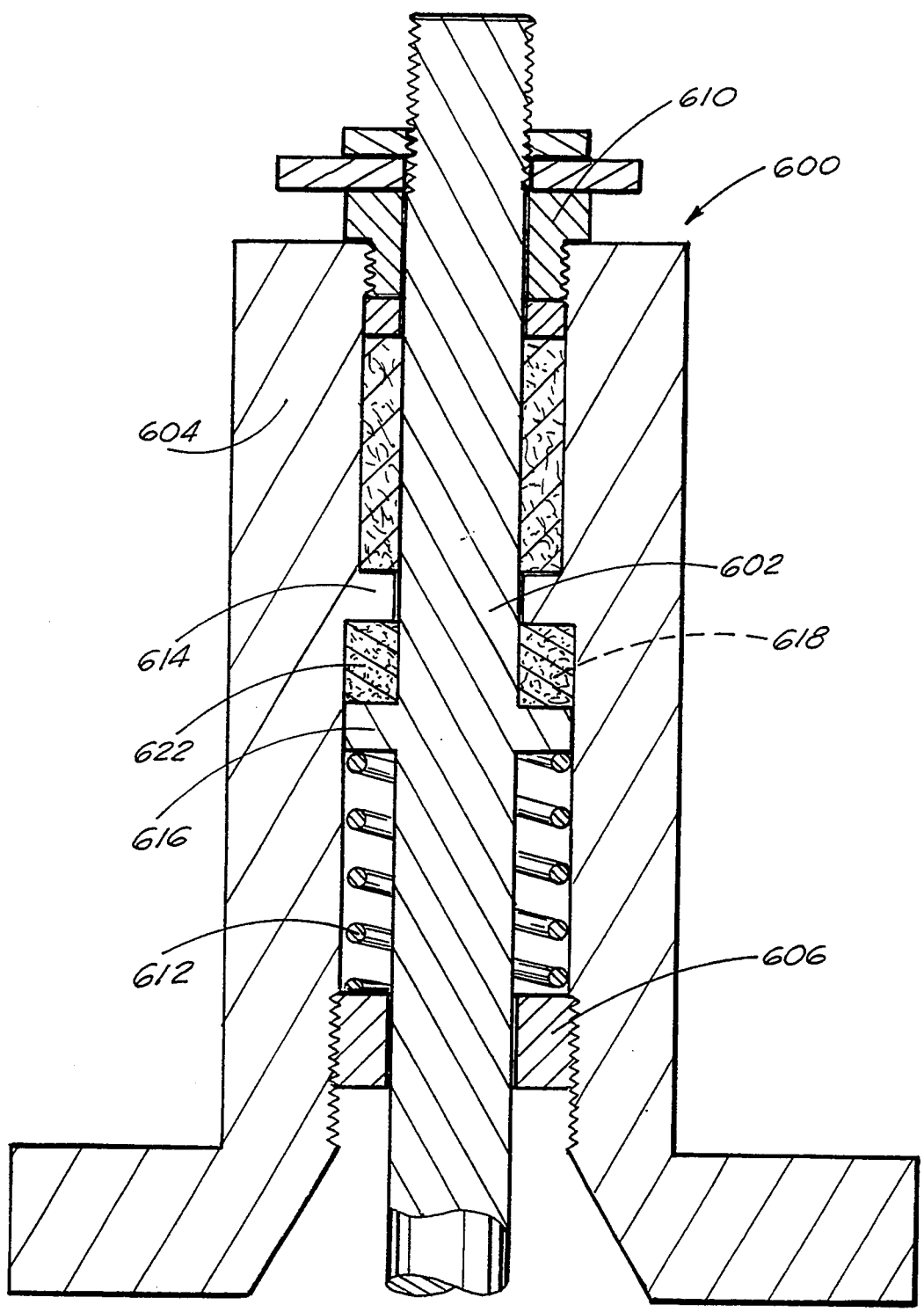

Reference is made to FIGS. 16–21 which illustrate two generic type valves, as seen in FIGS. 16 and 17, which would be retrofitted in this embodiment of the present invention. As illustrated in FIG. 16, there is illustrated a valve 600 of the type having a valve shaft 602 housed within a cylindrical valve bonnet 604 as illustrated. Valve shaft 602 would be threadably engaged within the bonnet 604 via a spider nut 606, and would include an upper section of packing material 608 held in place by a threaded cap 610. Further there would be included coil spring 612 which would be positioned between the spider nut 606 and a lower shoulder portion 614 formed in the wall of the bonnet 604. The shaft would include a lower enlarged portion 616 which would be positioned within a counter bore 618 in the valve bonnet, and through the compression of spring member 612 would be forced upward in the direction of arrow 620 and would engage a lower area of packing material 622 between the enlarged portion 616 and a shoulder 614 on the bonnet 604 extending into the shaft bore. Leaking of the valve along a vertical direction would be prevented between the packing material and the interior wall of the valve bonnet and the packing material and the wall of the valve shaft 602. This construction, as seen in FIG. 16, is a typical valve construction, and the packing material 622 often fails to establish the type of fluid seal that is necessary in this type of valve and leaks occur.

The second type of generic valve is illustrated in FIG. 17, which again, is a standard valve 600 including again the valve shaft 602 housed within the valve bonnet 604. In this particular embodiment, the valve shaft 602 is maintained within the valve via the cap member 610. There is a shoulder 614 formed in the wall of the valve bonnet, so that an enlarged portion 616 of valve shaft 602 engages the packing material 622 with a lower coil spring 612 forcing the shaft upward to engage the packing material 622 and again compress the packing material to avoid leaks between the valve bonnet and the shaft. Like in the first embodiment as illustrated in FIG. 16, however, the packing material 622 compressed between the enlarged valve shaft 616 and the shoulder 614 on bonnet 604 often leaks and in most cases the valve becomes inoperable.

Figure 18:
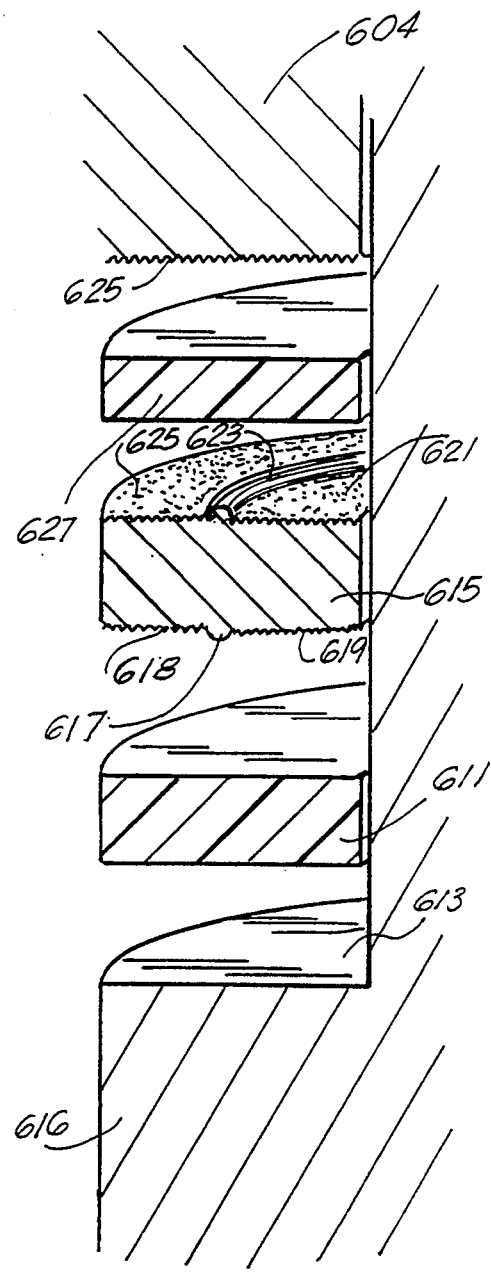
FIG. 18 illustrates an embodiment of the components utilized in retrofitting a valve with the present invention.

Reference is now made to FIGS. 18–21, which illustrate the means by which these two types of valves as illustrated in FIGS. 16 and 17 may be retrofitted with components of the present invention, so as to eliminate any leakage from occurring along the vertical wall of the valve bonnet 604 and valve shaft 602 by forming a horizontal seal between the valve bonnet and the valve shaft. In FIG. 18, there is illustrated a partial view of valve member where the packing material 622, which is positioned between the shoulder 614 and the enlarged portion 616 of valve shaft 602, has been removed from the valve, and in its place will be substituted the inventive means for forming the horizontal seal within the valve. As seen in FIG. 18, this means includes a first lower wafer 611 made of PTFE (Teflon—a registered Trademark owned by Dupont) placed on the upper surface of the enlarged portion 616 of valve shaft 602, which will be called a rotation surface 613, which is normally a highly polished surface. A metal ring means 615 is placed along shaft 602 positioned above wafer 611. This ring means 615 is constructed of a steel material, and in this particular embodiment would include a raised ring portion 617 on its lower surface 618, with a gnarled surface 619 along the remaining lower surface 618 of ring 615. Further, the upper surface 621 of ring 615 would likewise include a second raised ring 623 again with a gnarled surface 625 comprising the remainder of the upper surface 621 of ring 615. Next, positioned atop steel ring 615 would be a second PTFE wafer 627 which is substantially identical to the lower wafer 611. Once in position, the spider nut 606 would be tightened against the spring member 612 which would impart force of the valve bonnet 604 down to compress the wafers 611 and 627 against the steel ring insert 615. When this occurs, the raised rings 617, 623 would press into the surfaces of wafers 611 and 627, and form, for the most part, the primary horizontal seal 631 to effectively prevent fluid flow between lower wafer 611 and the lower surface 618 of steel ring 615 and fluid travel between upper wafer 627 and the upper surface 621 of steel ring 615 due to the compression of the wafers by the raised rings 617 and 623 respectively.

However, as was discussed earlier in the preferred embodiments in this application, the compression of the wafers 611, 627 at this point by the raised ring 617, 623 would effectively create a very high pressure point directly on all surfaces between the valve bonnet 604 through to the polished surface 613 of the enlarged valve shaft 616, thus effecting the continuous horizontal seal along vertical line 633 to restrict fluid flow between any of these components.

In this particular embodiment, the gnarled surfaces 619 and 625, as was described on the steel ring 615, would bite into the wafers 611 and 627 respectively, and would not rotate when the valve shaft 602 is rotated. The valve shaft would rotate between the lower surface of PTFE wafer 611 and the polished rotation surface 613 of the enlarged shaft 616. In theory this would be the most effective configuration of the valve used in the present invention.

The retrofitting of the valve as depicted in FIG. 16 could also be accomplished in the valve depicted in FIG. 17. Rather than duplicate a discussion of this particular embodiment, the same three components i.e. the lower wafer 611, steel ring 615 and upper wafer 627 would be placed into the valve shown in FIG. 17 by removal of the packing material 622 from the valve and in its place would be inserted these three components around the valve shaft 602. The only difference between these two valve configurations is that the spring 612 in FIG. 17 is below the enlarged portion 616 of valve shaft 602, and therefore the shaft is being forced upward. However, the same sealing effect as was described earlier is achieved.

Figure 19:
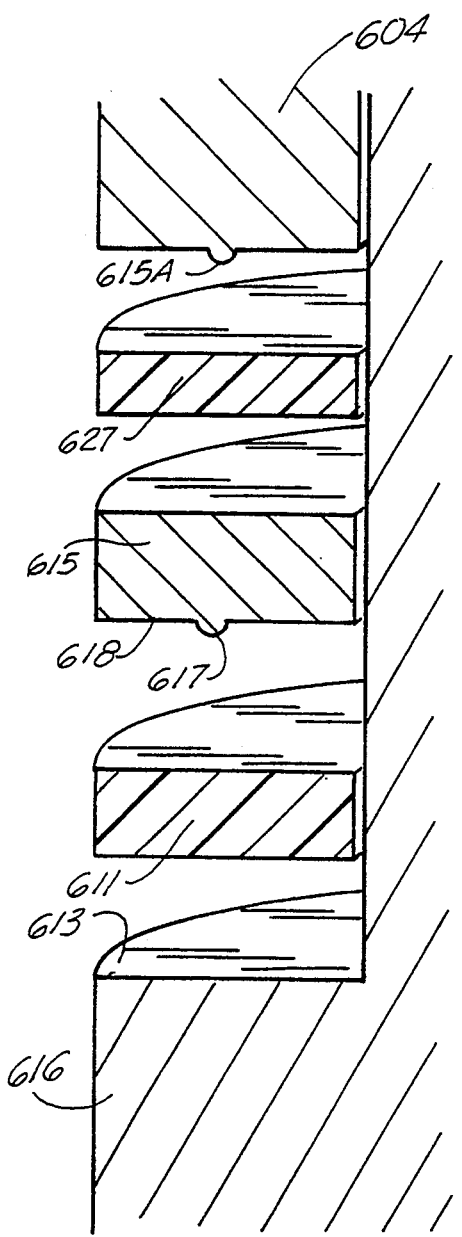
FIG. 19 illustrates an additional embodiment of the components utilized in retrofitting a valve with the present invention.

FIG. 19 illustrates a second embodiment of the three components i.e. lower wafer 611, steel ring 615 and upper wafer 627 utilized in this embodiment of the present invention. The only difference between this particular configuration and the configuration as was described in FIG. 18, is the fact that the steel ring 615 does not include a gnarled surface along its upper surface 621 or its lower surface 618. Neither does the steel ring 615 include the upper raised ring 623 that is seen in the embodiment in FIG. 18. The only raised ring is ring 617 on the lower surface 618 of steel ring 615. In addition, the shoulder 614 of the bonnet 604 would likewise have a raised ring 615A so that when the components are compressed by the coiled spring 612, the raised ring 615A would compress into the surface of upper wafer 627 and the lower raised ring 617 on steel ring 615 would compress into the lower wafer 611. When this is achieved, again there is effected the seal along the horizontal surfaces between the bonnet 604 and the upper wafer 627, between wafer 627 and the upper surface of steel ring 615, between the lower surface of steel ring 615 and the upper surface of lower wafer 611, and between the lower surface of wafer 613 and the upper polished surface of shoulder 616. The raised rings 615A, 617 would in effect create the most effective horizontal seal along line 633 and would preclude fluid travel along those horizontal surfaces. Further, this particular configuration would not necessarily preclude the wafers and the steel ring from rotating when the valve shaft 602 is rotated unlike the configuration illustrated in FIG. 16. Although rotation of the components is not to be desired, they may still rotate due to the fact that there is no gnarled surfaces on the steel ring as is shown in the configuration in FIG. 16.

As was stated earlier, this configuration in FIG. 19 is also able to be placed within each type of valve assembly as illustrated in FIGS. 16 and 17, by again removing the packing material 622 from the valve and replacing it with these three components. Actually, it should be kept in mind that any valve construction which utilizes packing between two horizontal surfaces to effect a seal could benefit from being retrofitted with the components as described in FIGS. 18 and 19.

Figure 21:
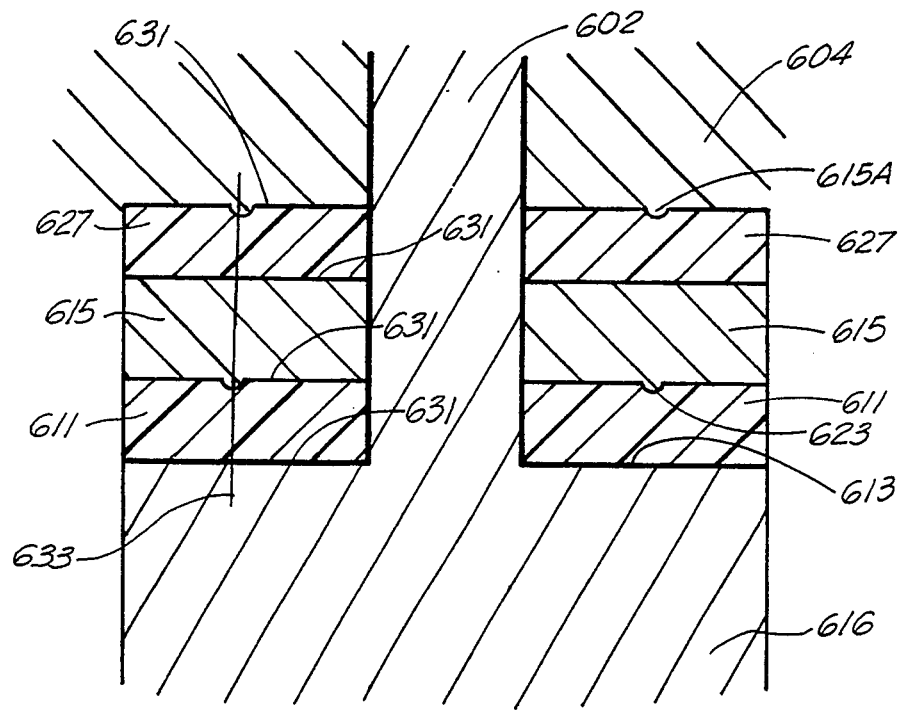
FIGS. 20 and 21 illustrate the two typical valves illustrated in FIGS. 16 and 17 with the valves retrofitted with the components of the present invention.
Figure 20:
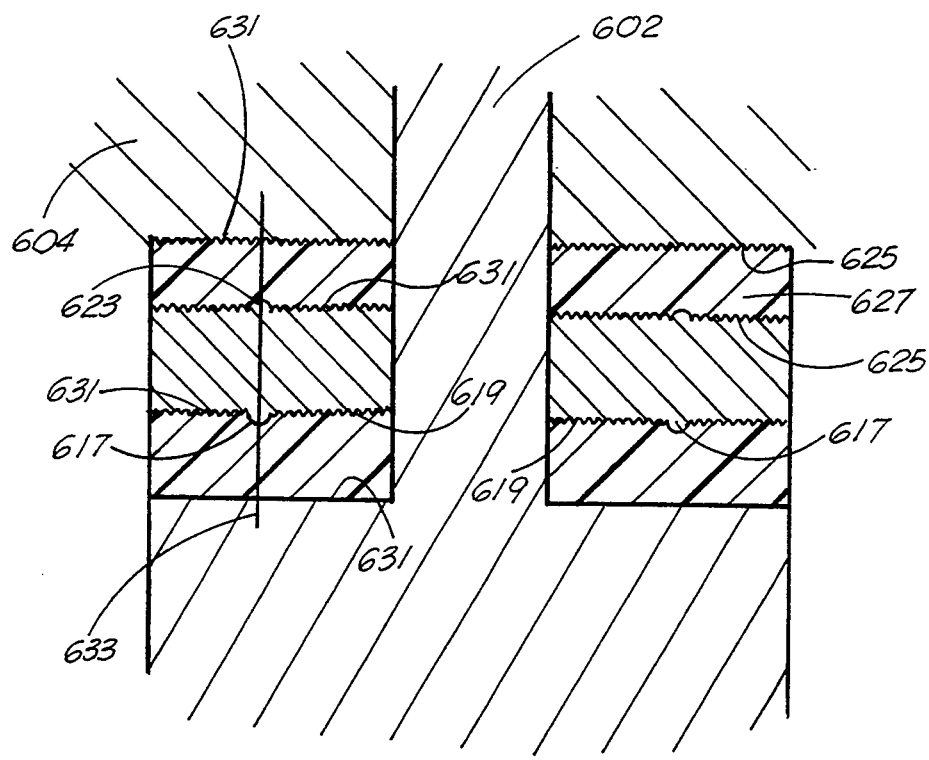

FIGS. 20 and 21 illustrate the two valve configurations illustrated in FIGS. 16 and 17 retrofitted with the components of the present invention. As seen in both figures, after the spring 612 have compressed the upper wafer 627 and the lower wafer 611 against the upper and lower surfaces 618, 621, respectively, of steel ring 615, a horizontal seal has been established between the wall of the bonnet 604 and the wall of the valve shaft 602. Thus, any fluid flow is precluded from flowing between the elements which have been retrofitted in the existing valves, with greater sealing ability due to the horizontal seals. This retrofitting process may be a cost saving measure for the number of valves which have to be discarded should the packing within the valve begin to leak.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. In a valve sealing apparatus, of the type comprising a valve housing, a valving member disposed within said valve housing, for controlling fluid flow therein, a valve bonnet having a continuous bore therethrough, said bonnet further comprising an enlarged radial portion extending into the bore of the bonnet, a valve shaft having an enlarged shoulder portion also extending into the bore in the valve bonnet, and a sealing material positioned in the bore of the valve bonnet around the valve shaft for sealing off fluid through the bore when the fluid flow acts against said enlarged shoulder portion, the improvement comprising:

a) a first compressible wafer positionable on the enlarged shoulder portion of the valve shaft in the bore around the valve shaft;
 b) a second noncompressible wafer positionable on the first wafer;
 c) a third compressible wafer positionable on the second wafer;
 d) means extending from the second wafer for pressing into a face of the first wafer and means extending from the radial portion of the valve bonnet for pressing into the face of the third wafer for imparting a force between the three wafers and the valve shaft shoulder portion and the radial portion of the valve bonnet, to seal against horizontal fluid flow between the valve body and the wall of the valve shaft; and
 e) means associated with the valve bore for maintaining force on the three wafers in order to maintain the seal.

2. The valve in claim 1, wherein the first and third wafers further comprise a wafer of polytetrafluoroethylene (PTFE).

3. The valve in claim 1, wherein the second wafer further comprises a ring of steel.

4. The valve in claim 1, wherein the second wafer further comprises a raised steel ring on its upper and lower surfaces for compressing the first and third wafers when the seal is being formed.

5. The valve in claim 1, wherein the lower surface of the first wafer would contact an upper polished surface of a shoulder portion formed by an enlarged area of the valve shaft, thus allowing rotation of the shaft while the three wafers remain stationary.

6. The apparatus in claim 1, wherein the means for maintaining force on the face of the primary sealing means comprises a spring within the valve bore.

7. In a valve of the type comprising a valve housing, a valving means disposed within said housing for controling fluid flow therein, a valve bonnet having a continuous bore therethrough, said bonnet further comprising an enlarged radial portion extending into the bore of the bonnet, a valve shaft including an enlarged shoulder portion housed within the bore of the valve bonnet and being guided by said enlarged radial portion; packing material positioned between the wall of the valve bonnet and the wall of the valve shaft, the packing material forming a fluid seal between the valve bonnet and the valve shaft, an improved sealing means positionable within the valve in place of the packing material, the improvement comprising:

a) a first compressible means positionable on the enlarged shoulder portion of the valve shaft in the bore around the valve shaft;
 b) a second compressible means also positionable in the bore around the valve shaft;

c) a non-compressible metallic ring disposed between said first and second compressible means, further comprising a raised portion extending from each face of the ring, for compressing a face of the first and second compressible means with a force to seal against horizontal fluid flow along a horizontal plane between the ring and the first and second compressible means, the valve body and the shoulder portion along the wall of the valve shaft; and d) means associated with the valve bore for maintaining sufficient force in order to maintain the seal.

8. In a valve of the type having a valve housing, a valving member disposed within said housing, a valve bonnet, a bore through the length of the valve bonnet, said bonnet further comprising an enlarged radial portion extending into the bore of the bonnet, a valve shaft including an enlarged shoulder portion housed within the valve bore of the bonnet, a spring positioned in the valve bore for exerting force between the valve body and the valve shaft, a sealing material positionable between two horizontal surfaces of the valve body and valve shaft, so that a fluid seal is formed when sufficient force is placed on the sealing material, an improved sealing means to replace the sealing material, the improved sealing means comprising:

a) a first compressible PTFE wafer positionable in the bore around the valve shaft;

b) a second compressible PTFE wafer also positionable in the bore around the valve shaft;

c) non-compressible metallic ring disposed between said first and second PTFE wafers, further comprising a raised portion extending from each face of the ring for compressing a face of the first and second compressible PTFE wafers with a force to seal against horizontal fluid flow along a horizontal plane between the ring and the first and second compressible wafers, the valve body and the shoulder portion along the wall of the valve shaft; and d) means for exerting said sufficient force upon the wafers and the ring to form the seal.

9. The apparatus in claim 8, wherein the means for maintaining force on the face of the primary sealing means comprises a spring within the valve bore.

10. The valve in claim 8, wherein the primary sealing means further comprises a wafer of polytetrafluoroethylene (PTFE).

* * * * *